(12) United States Patent
Perham et al.

(10) Patent No.: US 8,949,311 B2
(45) Date of Patent: *Feb. 3, 2015

(54) DYNAMIC, NON-INTRUSIVE PERSONALIZATION OF WEB SERVICES

(75) Inventors: Michael Perham, Austin, TX (US); Chaitanya Laxminarayan, Austin, TX (US); Matthew Sanchez, Round Rock, TX (US); Keith Yarbrough, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1654 days.

This patent is subject to a terminal disclaimer.

(21) Appl. No.: 10/898,633

(22) Filed: Jul. 23, 2004

(65) Prior Publication Data

US 2005/0086330 A1    Apr. 21, 2005

Related U.S. Application Data

(60) Provisional application No. 60/498,838, filed on Aug. 29, 2003.

(51) Int. Cl.
| | | |
|---|---|---|
| *G06F 15/16* | (2006.01) | |
| *H04L 29/08* | (2006.01) | |
| *G06F 9/445* | (2006.01) | |

(52) U.S. Cl.
CPC .......... *H04L 67/306* (2013.01); *H04L 67/2819* (2013.01); *H04L 67/02* (2013.01); *H04L 67/28* (2013.01); *G06F 9/44505* (2013.01)
USPC ......................................... 709/203; 709/204

(58) Field of Classification Search
USPC ......................................... 709/203, 204, 205
See application file for complete search history.

(56) References Cited

U.S. PATENT DOCUMENTS

| | | | | |
|---|---|---|---|---|
| 6,154,738 | A  * | 11/2000 | Call ................................... | 707/4 |
| 6,983,328 | B2 * | 1/2006  | Beged-Dov et al. .......... | 709/230 |
| 7,437,458 | B1 * | 10/2008 | Stewart et al. ................ | 709/226 |
| 7,472,349 | B1   | 12/2008 | Srivastava et al. | |
| 2002/0120685 | A1* | 8/2002 | Srivastava et al. ............ | 709/203 |
| 2002/0174241 | A1* | 11/2002 | Beged-Dov et al. .......... | 709/230 |
| 2003/0097485 | A1* | 5/2003 | Horvitz et al. ................ | 709/313 |
| 2003/0208563 | A1* | 11/2003 | Acree et al. ................... | 709/219 |
| 2004/0205613 | A1* | 10/2004 | Li et al. .......................... | 715/523 |
| 2006/0020586 | A1* | 1/2006 | Prompt et al. .................... | 707/3 |

OTHER PUBLICATIONS

Gokhale et al.; Reinventing the Wheel? CORBA vs. Web Services; 2002; pp. 1-20.
U.S. Appl. No. 11/123,630, filed Apr. 30, 2005, entitled "Method and Apparatus for Non-Intrusive Personalization of Services".

* cited by examiner

*Primary Examiner* — Ninos Donabed
(74) *Attorney, Agent, or Firm* — Stevens & Showalter, LLP

(57) ABSTRACT

A method and apparatus to employ a service proxy to dynamically personalize Web service messages by automatically supplying the interface parameters used for communications between a Web service provider and its client businesses. The service proxy does this according to context parameters that the client businesses specifies during configuration set up at the Web service provider's Web site and in messages used to communicate with one or more Web services. For simpler administration, the context variables may be organized in multiple kinds of hierarchies by which communications parameters specified at a higher level are automatically applied to categories at a lower level, although parameters specified directly for a lower-level category will override parameters from a higher category.

17 Claims, 18 Drawing Sheets

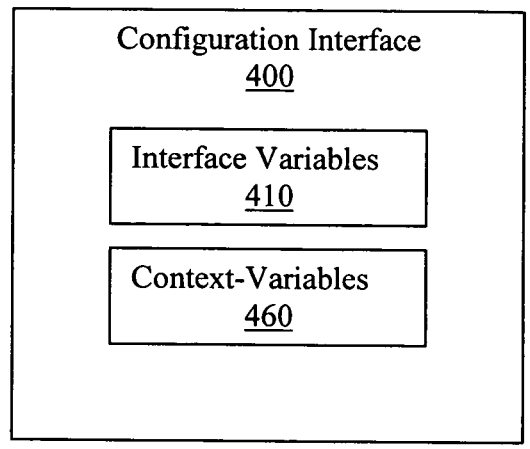
Fig 5
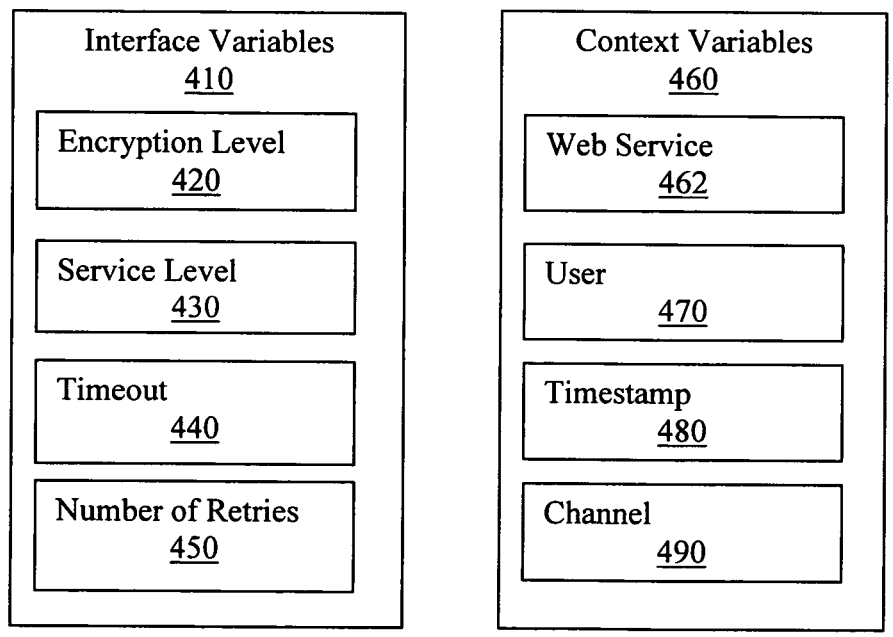
Fig 6  Fig 7

DYNAMIC, NON-INTRUSIVE PERSONALIZATION OF WEB SERVICES

CROSS-REFERENCE TO RELATED APPLICATIONS

This application claims the benefit of PPA Ser. No. 60/498,838, filed Aug. 29, 2003 by the present inventors.

FIELD OF THE INVENTION

This innovation relates to Web services, and, more particularly, to methods that supply the interface variables used for communications between a Web service provider and its client businesses' applications.

BACKGROUND OF THE INVENTION

Web Services

The promise of the Internet is an open e-business platform where companies can do business spontaneously with anyone, anywhere, and anytime without requiring that companies abandon their existing software applications and infrastructures. Increasingly companies rely on the Internet to obtain loosely coupled Web services deployed by Web service providers on application-based servers, which are computers on networks that mange the networks.

Web services are business-enterprise computer applications that can be utilized singly or collectively to accomplish a wide range of intended purposes, such as determining health-care patients' eligibility for benefits, submitting health-care claims, and providing stock quotes. Web services help companies dramatically cut costs, increase revenues, and improve competitive agility by combining existing, heterogeneous systems into cross-functional, multi-company applications. For example, Web services designed for insurance companies help them rapidly automate their business processes, eliminating paper and manual touches and saving them tens of millions of dollars annually. To supply such valuable and widely needed services, Web services providers may offer multiple Web services to client businesses.

Because Web services can operate independently of a particular computer language, platform, or location, a client business and a Web service may each use different computer languages, platforms, and locations in widely distributed systems over one or more networks.

Open Web service standards have been developed for compatibility among Web service applications. A standard called SOAP (Simple Object Access Protocol) has been developed to define the format of messages exchanged among applications. The content of messages, such as a request for an action to be performed by a Web service, is currently described in WSDL (Web Services Description Language), which is an XML (Extensible Markup Language)-formatted language and which serves as a Web service's interface. Web services are cataloged in a Web based directory and infrastructure called UDDI (Universal Description, Discover and Integration), which is an Internet registry where businesses list themselves according to their services. Communications between a client business and a Web service further rely on the use of a shared transport protocol, such as HTTP (Hypertext Transport Protocol), which enables communications over the Internet.

Typically a client business employs a client application to communicate from its Web site over the Internet according to these standards, to obtain the Web services offered by a Web service provider from its server-based Web site. The Web service provider uses the same standards to reply to a client. Other known or not-yet-known Web service protocols and standards may be used for this communications.

The Web service end point is the physical location of the Web service on a server and implements the Web service interface.

Soap Envelopes

To communicate with a Web service, a client application message typically contains a SOAP envelope, which in turn contains context headers and a message body. The headers indicate such parameters as the Web service to be invoked, the identity of the sender, and the channel to be used for transmissions. The message body indicates the message being sent to the Web service, for example a request to calculate the number of patient claims at a health insurance company.

Communications Parameters

A Web service provider processes incoming and outgoing messages from client applications according to communications parameters. For example, interface parameters may be required, comprising such elements as the level of service to which the client business is entitled for that Web service;

the level of encryption to be applied to messages from and to the client application;

the timeout used when establishing communication from or to a client application; and the number of retries to allow when establishing communication from or to a client application.

The specific content of this interface-variables metadata may depend on context variables, comprising, for example, the specific Web service to be used;

the specific user communicating with the Web service provider; and the transmission channel.

For example, different client businesses may require different parameters for interface variables. Furthermore, each client business may require different interface-variables parameters for particular users within its organization. For example, a business may require different levels of service from a Web service provider for a system administrator, an organization leader, and a user, and may want some interface-variables parameters to apply to all its employees and others to be open to personalization by individual employees or groups of employees.

To cite a further example of the importance of context variables, a business may require a higher level of encryption for messages transmitted over a person-operated handheld device channel than for messages over a machine-to-machine Web service channel.

Thus a large number of personalized communications parameters may need to be specified to a Web service provider for each incoming and outgoing message it handles, to enable it to identify the requirements for different client businesses and their employees. In a widely distributed system linking multiple client businesses, Web service providers, and Web services on multiple hardware and software platforms, the number of these parameters is still more greatly increased.

Prior Techniques

Client-business programming: Typically a client business manually programs its applications to specify in the message body the required communications parameters to the Web service provider, sometimes using a commercially available Web service application platform for assistance.

However, this technique is intrusive for the client businesses, since it is time-consuming and requires special and expensive programming skill, as well as knowledge of the communications parameters and their formats required by the Web service. Multiple client businesses of a Web service have to be responsible for correctly programming the required communications parameters for potentially large and changing staffs of employees and their needs, which can be burdensome and costly to them and can introduce programming errors.

Web service provider programming: Another technique is for the Web service provider to manually program its applications to specify the required communications parameters for each client business' applications and that business' employees, also sometimes using a commercially available Web service application platform, or one the Web service provider has Method and Apparatus for Dynamic Non-Intrusive Personalization of Web Services designed, for assistance.

But this technique is intrusive for the Web service provider, since it is very time-consuming for the Web service provider to have to laboriously specify the parameters for the needs of potentially thousands of clients and their employees.

US patent application number US2004/0068586 to Xie describes a Web service broker, used as a service proxy, that provides for the automatic conversion of message formats communications between a Web service and its client businesses' applications. But that method does not address the broad area of communications parameters, with interface parameters based on context parameters, that the present invention covers.

World Intellectual Property Organization patent application number WO 2004/040097 A1 to Butterworth describes a method of supplementing operations performed by a Web service through an autonomous software agent to facilitate the examination of the content of messages, the modification of the content of messages, the rerouting of messages, and the analysis of the content of messages. But that method also does not address the broad area of communications parameters, with interface parameters based on context parameters, that the present invention covers.

Therefore there is a need for a method and apparatus that provides a more automatic, and thus non-intrusive, method for supplying the desired communications parameters used for communications between a Web service provider and its client businesses dynamically, with interface parameters based on context parameters. Such a method and apparatus eliminates the need for time-consuming and expensive programming by the client businesses or the Web service provider.

BRIEF SUMMARY OF THE INVENTION

These and other needs are addressed by the present invention. The following explanation describes the present invention by way of example and not by way of limitation.

It is an aspect of the present invention to provide a method for supplying the desired communications parameters used for communications between a Web service provider and its client businesses that is automatic.

It is another aspect of the present invention to provide a method for supplying the desired communications parameters used for communications between a Web service provider and its client businesses that is dynamic, with interface parameters based on context parameters.

It is another aspect of the present invention to provide a method for supplying the desired communications parameters used for communications between a Web service provider and its client businesses that is hierarchical, for ease of administration.

It is another aspect of the present invention to provide a system that employs the methods of the present invention for supplying the desired communications parameters used for communications between a Web service provider and its client businesses.

These and other aspects, features, and advantages are achieved according to the method and apparatus of the present invention. In accordance with the present invention, a service proxy is used to automatically supply the communications parameters used for message communications between a Web service provider and its client businesses, according to parameters that the client businesses specify during configuration set up at the Web service provider's Web site. The service proxy does this dynamically, with interface parameters based on context parameters.

BRIEF DESCRIPTION OF THE DRAWINGS

The following embodiment of the present invention is described by way of example only, with reference to the accompanying drawings, in which:

FIG. 5 is a block diagram that illustrates a configuration interface that the Web service provider sets up so that a Web service client can configure communications parameters;

FIG. 6 is a block diagram that shows examples of interface variables that the Web service client can configure in the Web service provider's configuration interface;

FIG. 7 is a block diagram that shows examples of context variables that the Web service client can configure in the Web service provider's configuration interface;

DETAILED DESCRIPTION

The following description explains a method and apparatus that automatically supplies personalized communications parameters used for communications between a Web service provider and its client businesses, and does so dynamically, with interface parameters based on context parameters. The details of this explanation are offered to illustrate the present invention clearly. However, it will be apparent to those skilled in the art that the concepts of present invention are not limited to these specific details. Commonly known elements are also shown in block diagrams for clarity, as examples and not as limitations of the present invention.

Operating Environment

Figure 1:
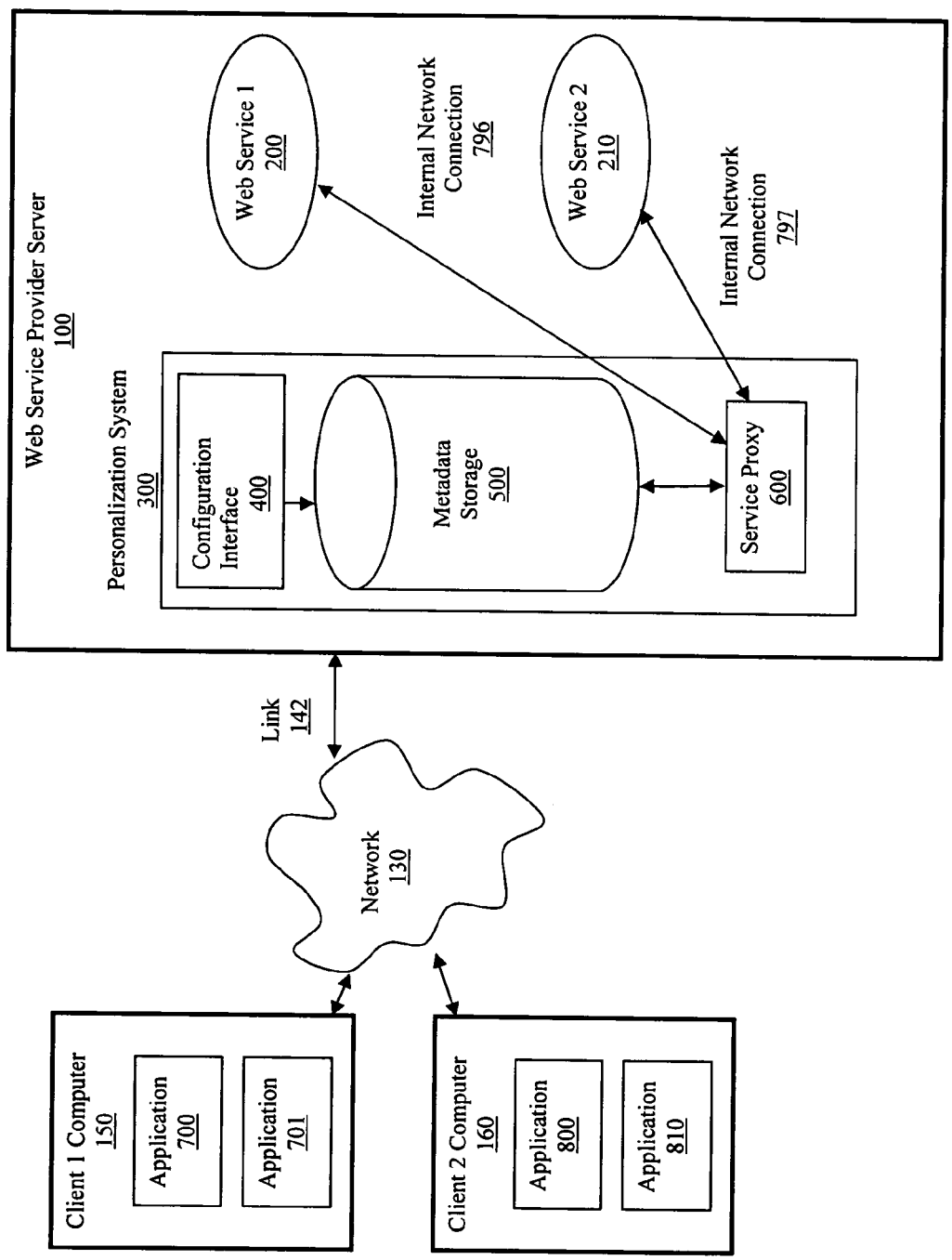
FIG. 1 is a block diagram showing an operating environment in which embodiments of the present invention may be employed.

An embodiment of an operating environment of the present invention is shown in FIG. 1. A Web service provider employs a server 100 to deliver one of more Web services 200 and 210, which may or may not be related and which may supply independent or combined processing, to client businesses. The server 100 may be a personal computer or a larger computerized system or combination of systems.

One or more client business, which may be related or of different types, employ one or more computers 150 and 160 to communicate over a communications network 130 and a wired or wireless link 142 with the Web service provider server 100. The client business computers 150 and 160 may be personal computers or computerized systems or combinations of systems comprising servers, for example.

The network 130 may be the Internet, a private LAN (Local Area Network), a wireless network, a TCP/IP (Transmission Control Protocol/Internet Protocol) network, or other communications system, and may comprise multiple elements such as gateways, routers, and switches.

To accomplish automatic and dynamic personalization of communications parameters, Web service provider server 100 employs a personalization system 300, comprising a configuration interface 400, metadata storage 500, and a service proxy 600. The service proxy 600 communicates with one or more Web services 200 and 210 through one or more internal network connections 796 and 797. In an embodiment, these personalization system 300 elements comprise a discrete system, but they can be distributed more loosely throughout the operating environment, as necessary and advantageous.

Through the operating environment shown in FIG. 1, one or more client applications 700, 701, 800, and 810, which may or may not be related to each other, from the same client business or different ones, can communicate with one or more Web services 200 and 210 offered by Web service provider server 100. These client applications are software programs with one or more sequences of instructions that can request information from general or specific Web services and with further instructions that can supply context information about the specific users of the applications.

Process of Supplying Communications Parameters—Overview

Figure 2:
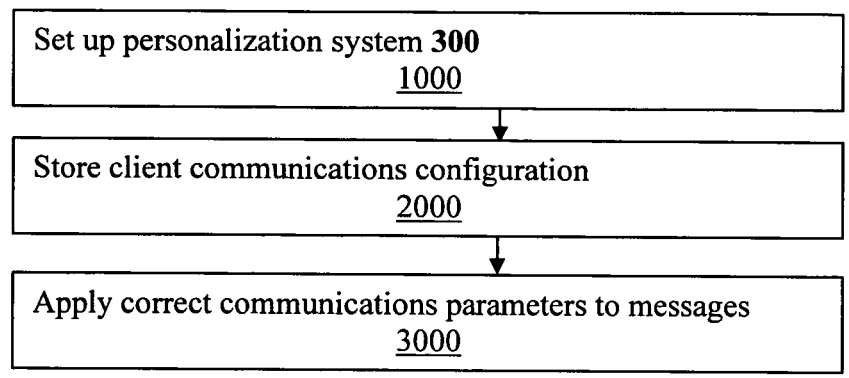
FIG. 2 is top-level flow chart that illustrates a process for a Web service provider to automatically supply the communications parameters used for message communications between a Web service provider and its client businesses.

FIG. 2 is top-level flow chart that illustrates a process for a Web service provider to automatically supply the communications parameters used for message communications between a Web service provider and its client businesses, through the operating environment shown in FIG. 1. It will be useful to explain the steps in this process briefly from a high level and then to expand elements of this explanation in detail.

Step 1000. Set Up Personalization System.

The Web service provider sets up WSDL documents for communicating with client business applications and a personalization system 300 for supplying the desired communications parameters to messages between client applications and the Web service provider's Web services.

Step 2000. Store Client Communications Configurations.

A client business uses the personalization system 300 to configure the communications parameters it wants to use for messages between one or more of its client applications 700 and 701 in FIG. 1 and one or more Web services 200 and 210.

Step 3000. Apply Correct Communications Parameters to Messages.

The personalization system 300 uses the client configurations and its internal instructions to apply correct communications parameters to messages between client applications 700 and 701 in FIG. 1 and one or more Web services 200 and 210.

Setting Up a Personalization System

Figure 3:
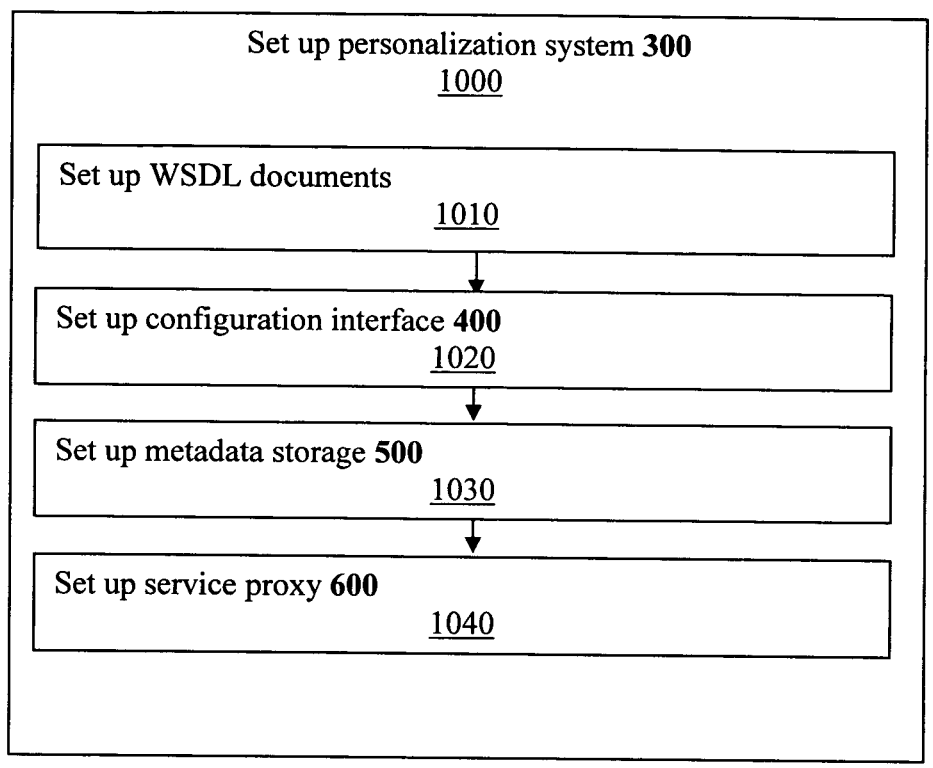
FIG. 3 is a flow chart that illustrates a process for a Web service provider to set up a personalization system.

FIG. 3 illustrates a process for a Web service provider to set up a personalization system at Step 1000, shown in FIG. 2.

Step 1010 in FIG. 3. Set up WSDL Documents.

In this embodiment, the Web service provider creates a set of WSDL documents that can be used to generate SOAP client applications. It publishes these documents so that client applications can access them and automatically incorporate their communications parameters into their messages. And it uses the headers prescribed by the WSDL documents to communicate context information to a personalization system 300 shown in FIG. 1.

Context Information

Figure 4:
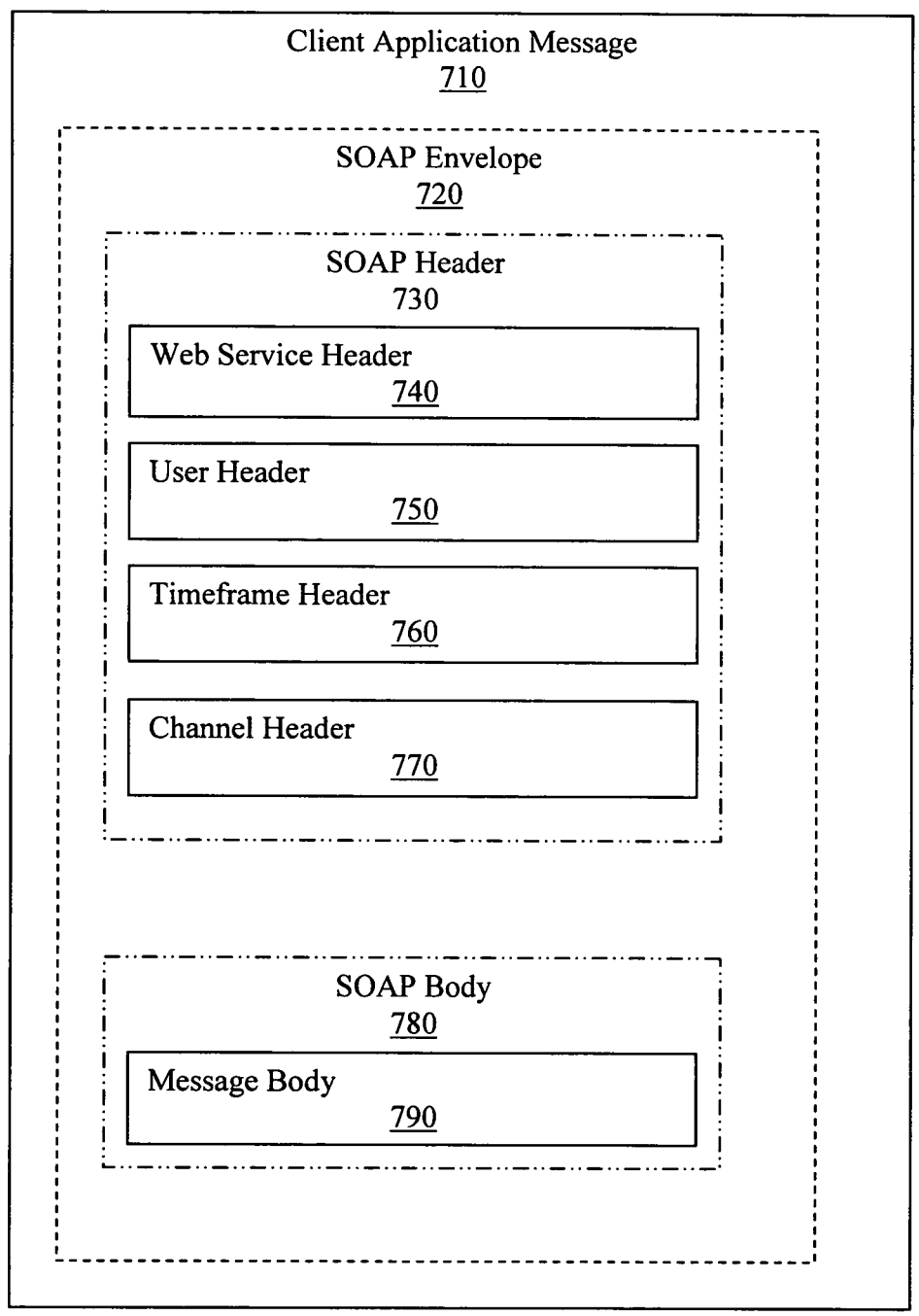
FIG. 4 is a block diagram that illustrates the SOAP information contained in a client application message.

FIG. 4 is a block diagram that illustrates the information contained in a client application message 710. The message comprises a SOAP envelope 720, which in turn comprises a SOAP header 730 for context information and a SOAP body 780 for the Web service request.

For example, the SOAP header may comprise the following sub-headers:

A Web service header 740 determines the specific Web service being contacted. For example, FIG. 1 shows a Web service provider offering two Web services 200 and 210. A client application message from a first client computer 150 could contain a Web service header that specifies that the message be sent to the URL for a first Web service 200. A second message from a first client computer 150 could contain a Web service header that specifies that the message be sent to the URL for a second Web service 210.

Returning to FIG. 4, a user header 750 indicates the user invoking the Web service. For example, the user could be an organization, a group within an organization, or an individual.

For a further example, a client business can set up a user header for Manager X for some of its client application messages to invoke Web service information that only Manager X should see. It could set up a user header for claims Department for other messages to invoke information of wider distribution. Business can devise many other types of user variables as needed.

The timestamp header 760 shown in FIG. 4 indicates the time when the message was created.

The channel header 770 indicates the transmission channel of the application message according to standards and protocols, such as HTTP (HyperText Transfer Protocol), FTP (File Transfer Protocol), Web Service, and EDI (Electronic Data Interchange).

Figure 23:
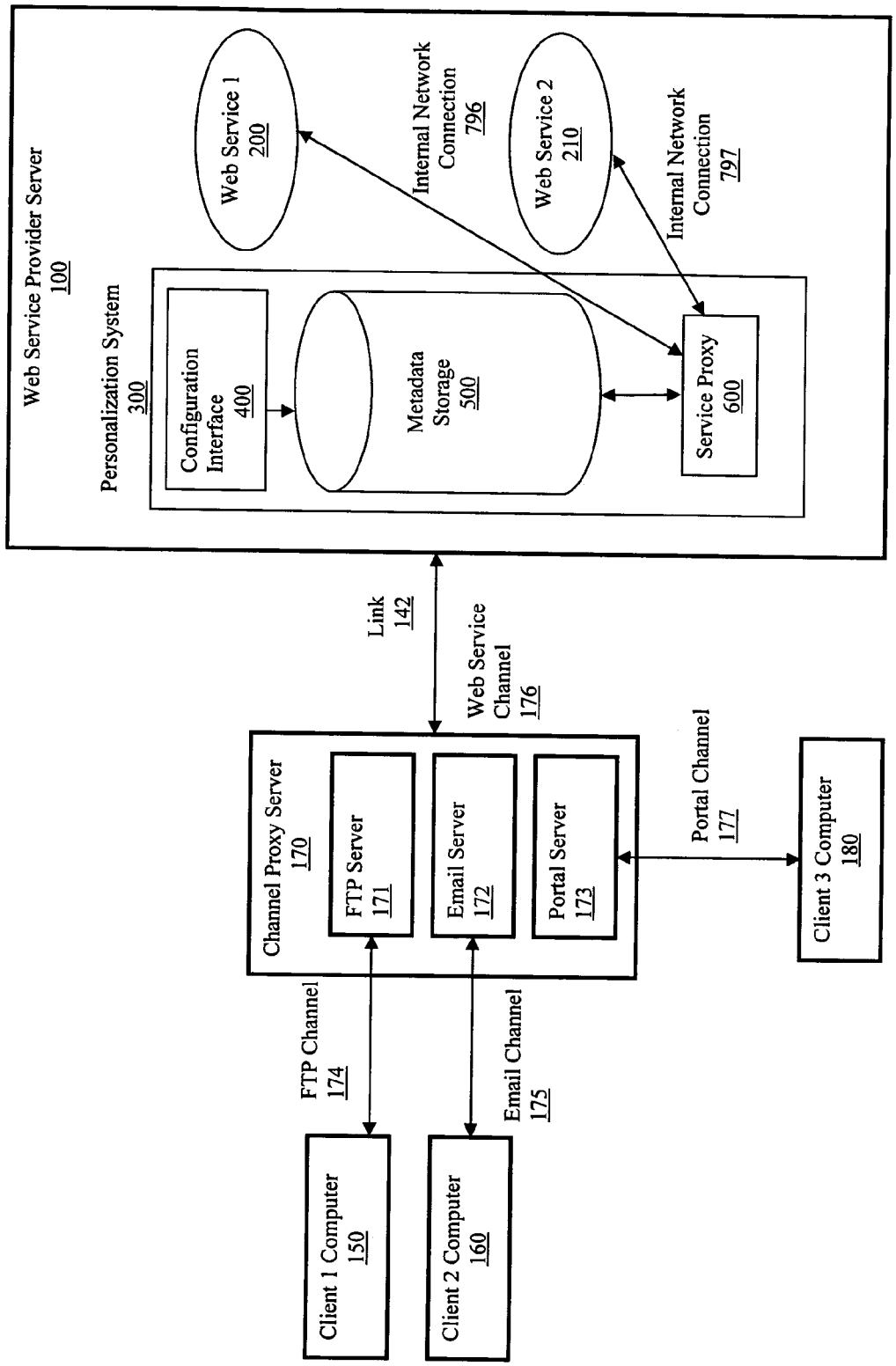
FIG. 23 is a block diagram showing a third alternate operating environment in which embodiments of the present invention may be employed, using a channel proxy server.

For example, a message directed to a Web service 200, shown in FIG. 1, through an FTP transmission might be converted to a Web service format by a channel proxy server 170, as shown in FIG. 23 and explained below. In this case, the converted message would contain SOAP information, including a channel header 770, shown in FIG. 4, indicating that the original transmission was in FTP format.

The message body 790 shown in FIG. 4 indicates the specific action requested from a Web service, such as a request for patient claims information or for a stock quote.

Example Of Context Information In Client Application Message

For example, a client business might create headers with the following context information in a SOAP envelope 720 that would accompany one of its application messages 710 to a Web service provider:

| | |
|---|---|
| Web Service Header 740: | Patient Claims Service |
| User Header 750: | Company A: Manager X |
| Timestamp Header 760: | May 1, 2004 3:00 pm |
| Channel Header 770: | EDI |
| Message Body 790: | Report on new patient claims for Company A. |

Note that in other embodiments timestamp header information can be supplied by a channel-specific internal date. For example, when a client submits a document through a bulletin board, the bulletin board may convert the message to a SOAP message with a timestamp header.

Setting Up a Configuration Interface

In this embodiment, the next step in creating a personalization system 300 in FIG. 1 is the following:

Step 1020 in FIG. 3. Set Up Configuration Interface.

Web site interfaces are computer-programmed modules that allow end-users to select variables and parameters from easy-to-use visual displays or to type in this input, save the information through selecting a save option, and have their selections automatically applied by computer subsequently, without those users having to program the information manually.

In an embodiment of the present invention, the Web service provider creates a configuration interface 400, shown in FIG. 1, which client businesses can access over the Internet by entering the URL for the Web service provider's server 100 in FIG. 1. Client businesses can then employ the configuration interface 400 to set up communications parameters to be applied automatically to messages between their client applications 700 and 701 and Web services 200 and 210.

For example, Insurance Company A might set up instructions so that outgoing messages sent out by Manager X would convey the information "Request for Web Service 1 by Company A and by Manager X." It might also set up instructions for outgoing messages from claims Adjustor Y that would convey similar information, but by "claims Adjustor Y." In its Web service provider's configuration interface, Insurance Company A might further enter parameters for the following results: Requests for Web Service 1 by Insurance Company A and Manager X would generate reports for the current number of patient claims nationwide. But requests for Web Service 1 by Insurance Company A and claims Adjustor Y would generate reports for the current number of patient claims only from Houston.

Communications Variables

FIG. 5 shows examples of variables useful for the configuration interface 400, comprising interface variables 410 and context variables 460.

Interface Variables

As shown in FIG. 6, the interface variables 410 for an embodiment may comprise the encryption level 420 to be applied to messages;

the service level 430 to which the client business is entitled;

the timeout 440 used when establishing communication from or to a client application; and the number of retries 450 to allow when establishing communication from or to a client application.

Context Variables

FIG. 7 shows examples of context variables 460 that may be used dynamically to determine the values of the interface variables in an embodiment. These context variables correspond to the context header information contained in client application messages, explained above, and may comprise the Web service 462 being invoked;

the user 470 sending the message;

the timestamp 480 for when a client application message was created; and the channel 490 of transmission of the application message.

User Variables

Figure 8:
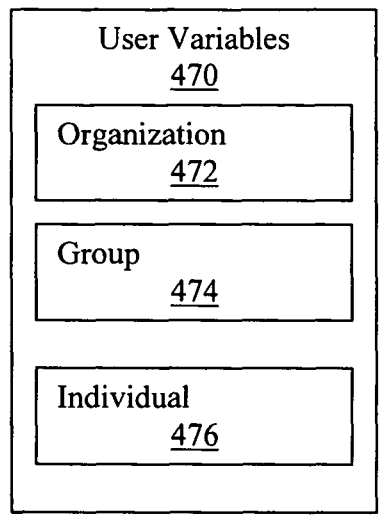
FIG. 8 is a block diagram that shows examples of user context variables that the Web service client can configure in the Web service provider's configuration interface.

FIG. 8 shows examples of user variables 470 that can be useful for configuration interface 400 in FIG. 4. User variables 470 in FIG. 8 identify the sender of a client application message and may comprise an organization 472;

a group 474; and an individual 476.

Channel Variables

Figure 9:
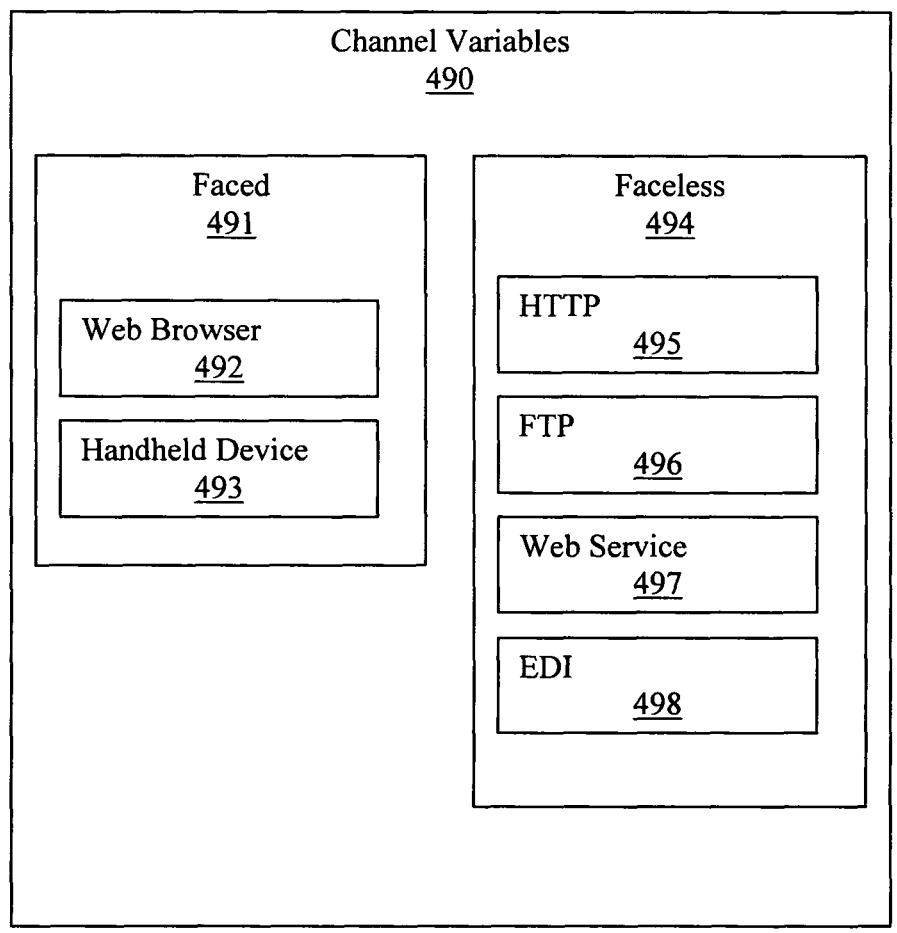
FIG. 9 is a block diagram that shows examples of channel context variables that the Web service client can configure in the Web service provider's configuration interface.

FIG. 9 shows that many channel variables 490 can be indicated in configuration interface 400 in FIG. 5, comprising faced variables 491, shown in FIG. 9, and faceless variables 494, with their appropriate standards and protocols.

Faced variables 491 have to do with messages sent by human operators, comprising devices using Internet Web browser 492 technology, as when a person uses Internet Explorer to contact a Web site, and handheld devices 493 such as wireless telephones and PDAs (Personal Data Assistants).

Faceless variables 494 concern machine-to-machine methods of transmission, with their appropriate standards and protocols, comprising the following, for example:

HTTP (HyperText Transfer Protocol) 495

FTP (File Transfer Protocol) 496

Web Service 497

EDI (Electronic Data Interchange) 498.

Setting Up Metadata Storage

In this embodiment, the next step in creating a personalization system 300, shown in FIG. 1, is the following:

Step 1030 in FIG. 3. Set Up Metadata Storage.

Metadata storage 500 in FIG. 1 may be non-volatile data storage used to store the parameters for communications variables supplied by the client business through the configuration interface 400 and information created by the Web service provider for applying and administering communications parameters. In addition, metadata storage 500 provides access to these user configurations and to Web service provider information to the service proxy 600.

Figure 10:
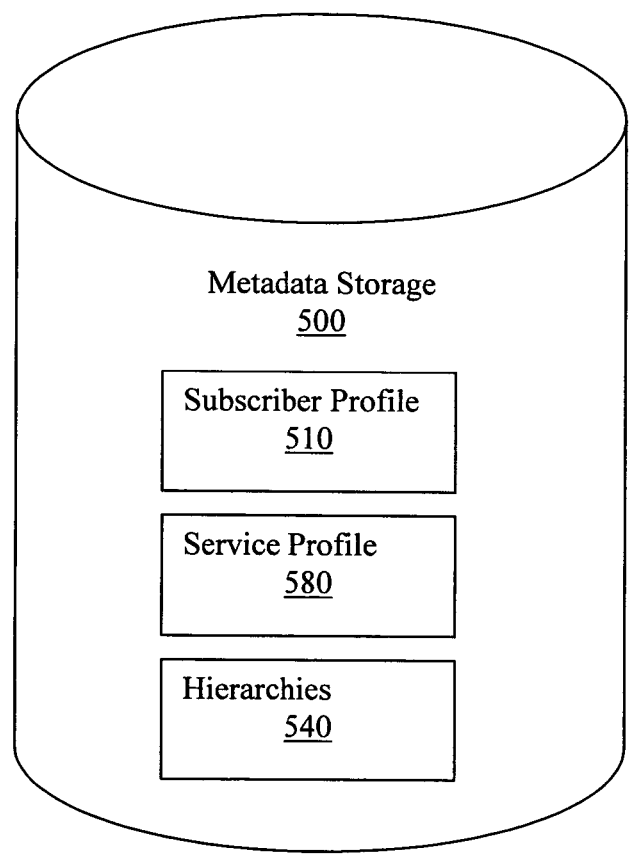
FIG. 10 is a block diagram of a metadata storage.

FIG. 10 shows that metadata storage 500 stores user-configured parameters as subscriber profiles 510 and Web service provider configured information as service profiles 580 and hierarchies 540.

Subscriber Profiles

A client business with multiple users and client applications might have multiple corresponding subscriber profiles. Different client businesses would, of course, potentially have multiple different subscriber profiles for their employees and client applications.

Example of a Subscriber Profile

A subscriber profile 510 configured by a client on configuration interface 400 in FIG. 1 and stored in metadata storage 500 might contain the following information:

For a client application with the following header context information:

| | |
|---|---|
| Web Service: | Patient Claims Service |
| User: | Company A: Manager X |
| Timestamp: | May 1, 2004 3:00 pm |
| Channel: | EDI |

Message Body: Report on new patient claims for Company A. apply to this message the following interface parameters:

| | |
|---|---|
| Encryption Level: | Low |
| Service Level: | Highest |
| Timeout: | 10 |
| Number of retries | 30 |

Transmit the configured message to the Patient claims Web service and invoke that service to calculate the number of new patient claims nationwide for Company A and send the result to Manager X's e-mail address, by EDI transmission, using the same interface parameters.

Service Profile

Service profiles 580 in FIG. 10 represent data a Web service provider creates to specify Web service information, such as the communications parameters that a specific Web service can accommodate, for example the protocols and encryption levels the Web service can use. A Web service can have multiple service profiles, depending, for example, on the client business' service level and the capabilities of the individual Web service.

Hierarchies

For simpler administration of the personalization system 300, shown in FIG. 1, the Web service provider can set up and store in metadata storage 500 in FIG. 10 hierarchies 540 for use with context variables 460 in FIG. 7.

Figure 11:
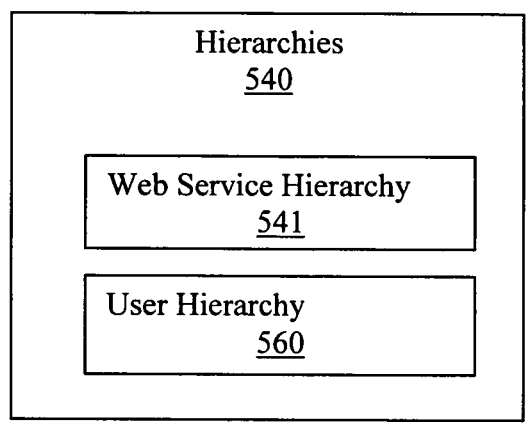
FIG. 11 is a block diagram of examples of hierarchies for applying communications parameters that the Web service provider can provide in metadata storage.

Context variables 460 may be organized in multiple kinds of hierarchies 540, shown in FIG. 10, by which communications parameters specified at a higher level are automatically applied to categories at a lower level, although parameters specified directly for a lower-level category will override parameters from a higher category. As shown in FIG. 11, examples of useful categories for hierarchies 540 comprise Web service hierarchies 541 and user hierarchies 560. In other embodiments, other context variables may be organized into hierarchies, for example channel variables or any others that businesses may find useful.

Web Service Hierarchies

Figure 12:
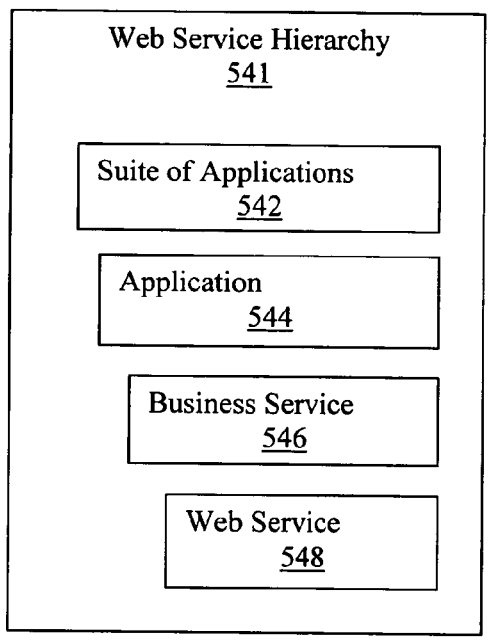
FIG. 12 is a block diagram that shows examples of Web service hierarchies for applying communications parameters that the Web service client provider can provide in metadata storage.

FIG. 12 shows an example of a Web service hierarchy 541 comprising the following categories:

suite of applications 542, at the highest level;
application 544, at the second highest level;
business service 546, at the third highest level; and
Web service 548, at the lowest level.

For example, a Web service provider might offer, along with other suites of services, a "Health Care" suite of multiple health-care related services for the suite of applications category 542. At the application level 544, the Web service provider might set up multiple applications, including one for "claims Filing." At the business service level 546, the Web service provider could set up multiple business services, with one for "claims Uploading," and at the Web service level 548, multiple Web services, with one called "Upload Service."

To utilize this hierarchy for simpler administration, the Web service provider would set up a conversion algorithm for its configuration interface 400 in FIG. 1 so that all message communications parameters set up for the "Health Care" Network would apply automatically to claims Filing, claims Upload, and Upload Service. A parameter set up directly for the claims Upload service, however, would override the analogous parameter set up for Heath Care and would also apply to the claims Upload and Upload Services.

User Hierarchies

Figure 13:
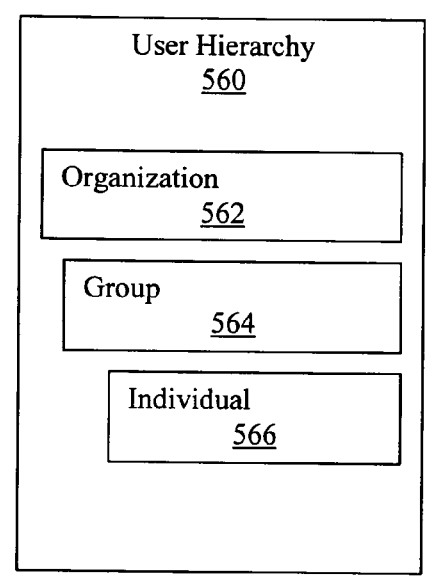
FIG. 13 is a block diagram that shows examples of user hierarchies for applying communications parameters that the Web service provider can provide in metadata storage.

FIG. 13 shows an example of how a Web service provider can also organize a user hierarchy 560 of multiple levels for simplified administration. In an embodiment, the highest level is for the organization 562, the next highest level is for the group 564, and the lower level is for the individual 566, who is one of potentially multiple users belonging to the organization. For example the organization 562 level could represent a system administrator, the group 564 level could represent an administrator, and the individual 564 level could represent an end-user. In this example, the parameters for user-hierarchy variables would need to specify an organization identifier, a group identifier, and an individual identifier.

Further useful divisions of these hierarchies are possible. For example, the organization 562 level could itself be further divided into sub-organizations. Company A might be the organization 562 level, with sub-organizations called "Sales Division" and "Development Division."

Combined Hierarchical Order

The following example shows a section of a query algorithm for hierarchies 540, shown in FIG. 10, which can be used to find the most appropriate values for contexts:

Determine the parent categories of the Web service
For each category in that hierarchy from least to most specific do
    Get values for <suite of applications, now>
    Get values for <suite of applications, organization, now>
    Get values for <suite of applications, group, now>
    Get values for <suite of applications, individual, now>
Done.

This algorithm uses the hierarchies cited in FIG. 12 and FIG. 13 to apply parameters in the following combined hierarchical order:

suite of applications
suite of applications, organization
suite of applications, group
suite of applications, individual
application
application, organization
application, group
application, individual
business service
business service, organization
business service, group
business service, individual
Web service
Web service, organization
Web service, group
Web service, individual.

Setting Up a Service Proxy

In this embodiment, the final step in creating a personalization system 300, shown in FIG. 1, is the following:

Step 1040 in FIG. 3. Set Up Service Proxy.

A service proxy 600 in FIG. 1 may be a computer software program, comprising one or more engines. For the personalization system 300, the Web service provider creates a service proxy 600 that manages the application of communications parameters to messages between one or more client applications 700, 701, 800, and 810 and one or more Web services 200 and 210 and relays each message to the appropriate Web service for execution. The service proxy 600 may be programmed to work with specific client applications 700, 701, 800, and 810 or to work generally with any invoking client application.

In an embodiment, client message applications sent to a Web service 200 contain information in their Web service headers 740 in FIG. 4 that direct the message to the desired Web service 200 in FIG. 1. For example, a client application message could contain the URL for the desired Web service 200. But the service proxy 600 is set up by the Web service provider to receive all client application messages first and afterwards to send them on to the correct Web service 200.

Elements Employed by a Service Proxy

Figure 14:
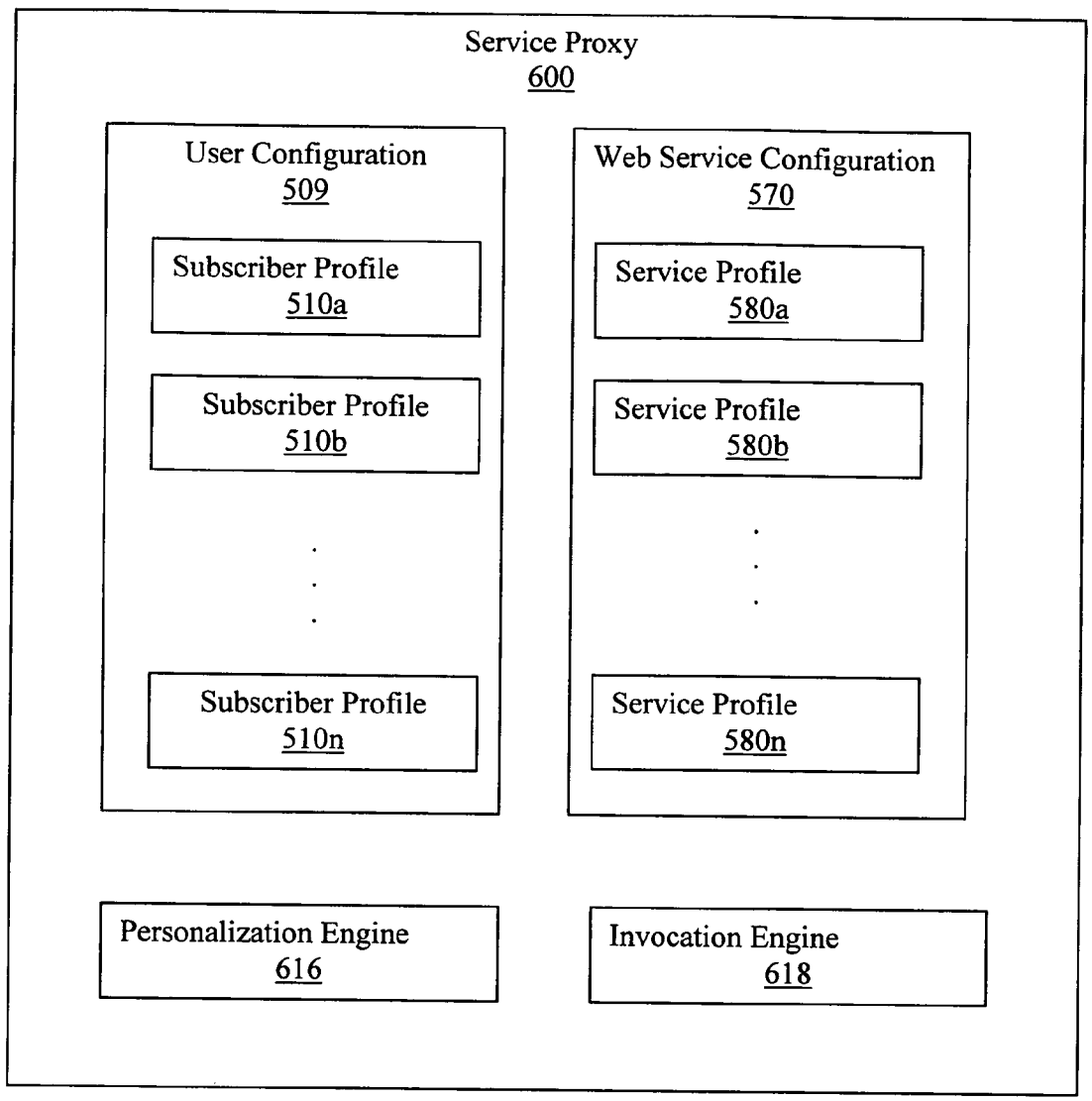
FIG. 14 is a block diagram that illustrates the components used by a service proxy.

FIG. 14 is a block diagram that illustrates the elements that a service proxy 600 employs in this embodiment, which comprise user configuration information 509;
Web service configuration information 570;
a personalization engine 616; and
an invocation engine 618.

User Configuration Information—Service Policies

The user configuration information 509 for a service proxy 600 comprises service policies 510*a-n* that the service proxy 600 retrieves from metadata storage 500, shown in FIG. 10. These service policies 510*a-n*, shown in FIG. 14, represent data indicating the communications parameters that client businesses have set up through a Web service provider's configuration interface 400 in FIG. 1.

Figure 15:
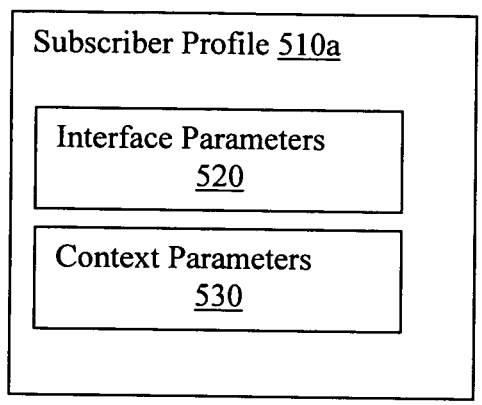
FIG. 15 is a block diagram that illustrates an example of a subscriber profile that can be used by a service proxy to personalize communications parameters.

As can be seen in FIG. 15, a subscriber profile 510*a* comprises data on interface parameters 520 and context parameters 530. FIG. 6 lists examples of the interface variables 410 for these parameters and FIG. 6 examples of the context variables 460.

Web Service Configuration Information

The Web service configuration information 570, shown in FIG. 14, comprises the service profiles 580*a-n* for specific Web services, indicating, for example, the type of protocols and encryption levels that each of these Web services can use. The service profiles 580*a-n* are stored in metadata storage 500, shown in FIG. 10.

A Web service can potentially have multiple service profiles 580 for different communications parameters that are required by different client business applications.

If Web service 200, shown in FIG. 1, is being invoked, for example, service profile 580*a*, shown in FIG. 14, might contain the protocols and encryption levels that Web service 200, shown in FIG. 1, can use for a specific client business application. The service proxy 600, shown in FIG. 14, could then use service profile 580*a* to determine the configuration information that the Web service 200 in FIG. 1 requires for use with the client business application.

Personalization Engine

The personalization engine 616 shown in FIG. 14 may be a software program representing a matching algorithm that the service proxy 600 uses to match the interface parameters 520 in FIG. 15 from a subscriber profile 510*a*, shown in FIG. 14, to the interface parameters from a service profile 580, shown in FIG. 10, based on a message's context parameters 530, shown in FIG. 15.

Invocation Engine

The invocation engine 618 shown in FIG. 14 may be a software program that the service proxy 600 employs to relay a personalized client application message to a Web service and activate the Web service to execute the request contained in that message.

Receiving and Storing Configurations

To return to FIG. 2, after setting up personalization system 300 in Step 1000, a Web service provider can use personalization system 300 to store client communications configurations in Step 2000. Personalization system 300 accomplishes this by receiving client configurations in Step 2010 in FIG. 16 through the configuration interface 400 in FIG. 1.

Figure 16:
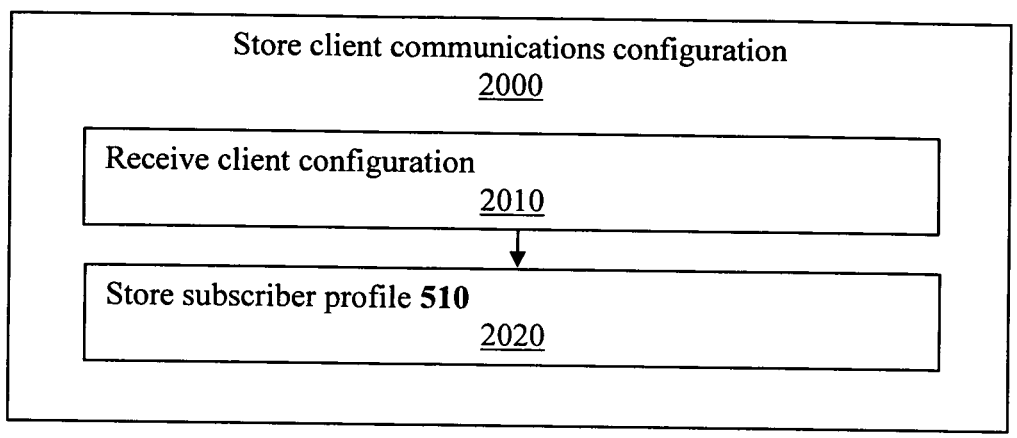
FIG. 16 is a flow diagram that illustrates a process of storing client communication-parameters configurations.

Personalization system 300 then stores these client configurations in metadata storage 500, as subscriber profiles 510 in FIG. 10, in Step 2020 in FIG. 16.

Applying Communication Parameters

Returning again to FIG. 2, the final step in the overall process of this embodiment is to apply the correct communications parameters to client application messages in Step 3000. The details of Step 3000 are shown in FIG. 17.

Personalizing Incoming Messages

Figure 17:
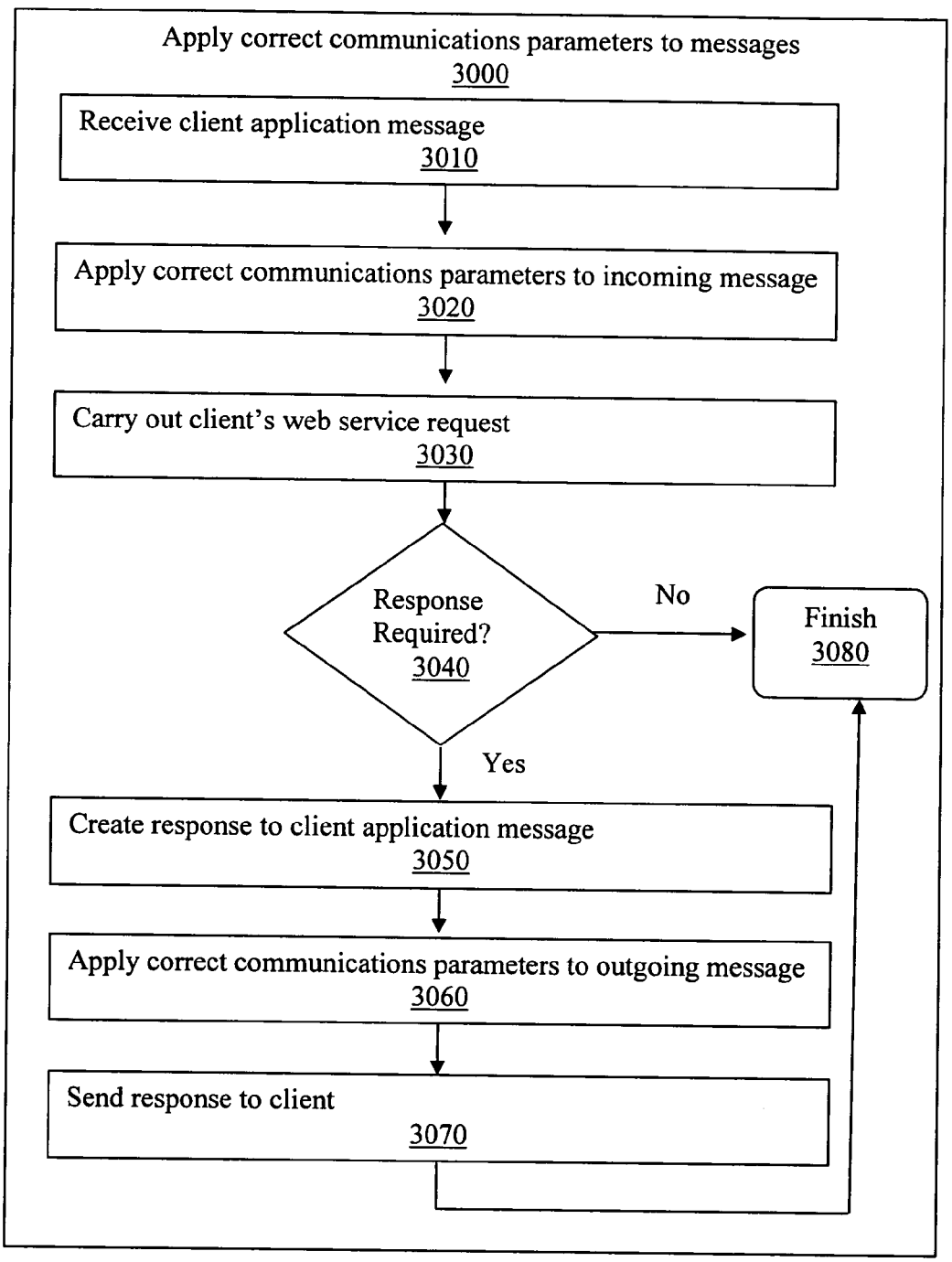
FIG. 17 is a flow diagram that illustrates a process used to apply correct communications parameters to messages.

Step 3010 in FIG. 17. Receive Client Application Message.

The service proxy 600 in FIG. 1 receives a message from a client application 700.

Step 3020 in FIG. 17. Apply Correct Communications Parameters to Message.

The service proxy 600 automatically applies the correct communications parameters to the client application message, following the steps outlined below in FIG. 18.

Figure 18:
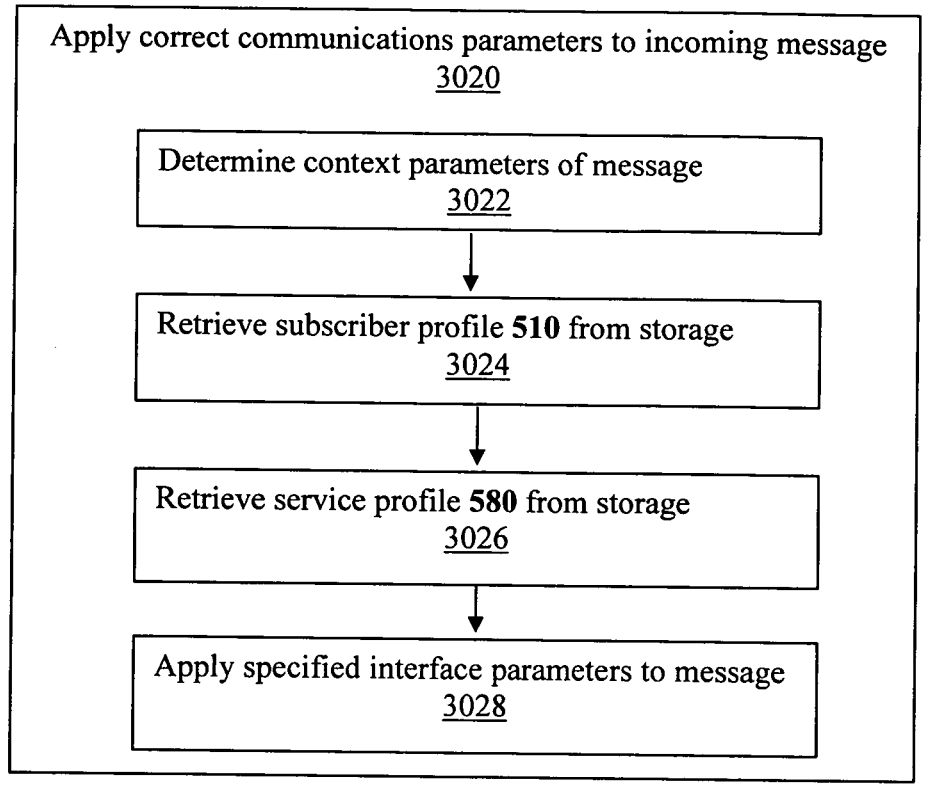
FIG. 18 is a flow diagram that illustrates a process a service proxy uses to apply correct communication parameters to incoming messages from a client application to a Web service.

Step 3022 in FIG. 18. Determine Context Parameters of Message.

The service proxy 600 in FIG. 1 reads the context parameters contained in the client application message's SOAP header 730, shown in FIG. 4.

Step 3024 in FIG. 18. Retrieve Subscriber Profile 510 from Storage 500.

Using the context parameters, the service proxy 600, shown in FIG. 1, retrieves the correct subscriber profile 510, shown in FIG. 10, for the message from metadata storage 500.

Step 3026 in FIG. 18. Retrieve Service Profile 580 from Storage 500.

Using the context parameters, the service proxy 600 in FIG. 1 performs a search using the matching algorithm to find the best service profile 580, shown in FIG. 10.

Step 3028 in FIG. 18. Apply Specified Interface Parameters to Message.

The service proxy 600 in FIG. 1 applies the interface parameters specified in the subscriber profile 510, shown in FIG. 10, and the service profile 580 to the message through the personalization engine 616, shown in FIG. 14.

Step 3030 in FIG. 17. Carry Out Client's Web Service Request.

The service proxy 600, shown in FIG. 1, sends the personalized message to the specified Web service 200. The Web service 200 executes the request contained in the SOAP message body 790, shown in FIG. 4, of the client application message 710.

Personalizing Outgoing Messages

Returning to FIG. 17, in some cases a client application may require a response. For example, a client application message might be a submission of a patient's insurance claim to a Web service that records patient claims, evaluates them, and pays them. The client application message may also request a response from the Web service indicating that the Web service received the claim and providing a tracking tag that can be used to determine the status of the claim.

Step 3040. Response Required?

If the answer is no, the process concludes with Finish 3080. The Web service 200, shown in FIG. 1, has completed the request contained in the SOAP message body 790, shown in FIG. 4, of the client application message 710.

If the answer is yes, the process continues to Step 3050, shown in FIG. 17.

Step 3050 in FIG. 17. Create Response to Client Application Message.

The Web service 200, shown in FIG. 1, creates an appropriate response to the client application message and sends the response to the service proxy 600.

Step 3060 in FIG. 17. Apply Correct Communications Parameters to Message.

The service proxy 600 automatically applies the correct communications parameters to the client application message, following the steps outlined below in FIG. 19.

Figure 19:
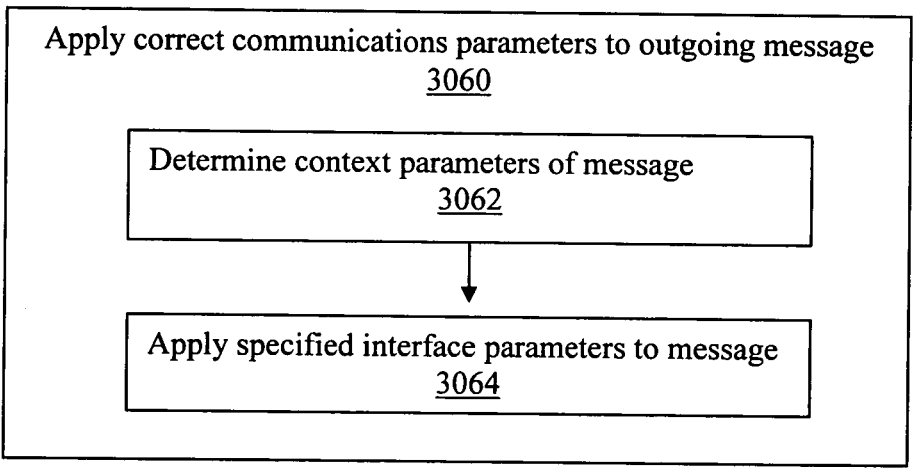
FIG. 19 is a flow diagram that illustrates a process a service proxy uses to apply correct communication parameters to outgoing messages from a Web service to a client application.

Step 3062 in FIG. 19. Determine Context Parameters of Message.

After receiving the message from the Web service 200, shown in FIG. 1, to the client application 700, the service proxy 600 employs the context parameters of the outgoing message. These context parameters are still known to the service proxy 600 from the corresponding incoming client application message.

The service proxy 600 also employs the interface parameters from the correct subscriber profile 510 for the message. These interface parameters are still known to the service proxy 600 from the corresponding incoming client application message.

Step 3064 in FIG. 19. Apply Specified Interface Parameters to Message.

The service proxy 600, shown in FIG. 1, applies the interface parameters specified in the subscriber profile 510, shown in FIG. 10, and service profile 580 to the outgoing message through personalization engine 616, shown in FIG. 14.

Step 3070 in FIG. 17. Send Message to Client.

Returning to FIG. 17, the service proxy 600 in FIG. 1 sends the personalized message to the client application 700.

Step 3080. Finish.

After the service proxy 600 sends the personalized message to the client application 700, the personalization process finishes.

Computer System Overview

Figure 20:
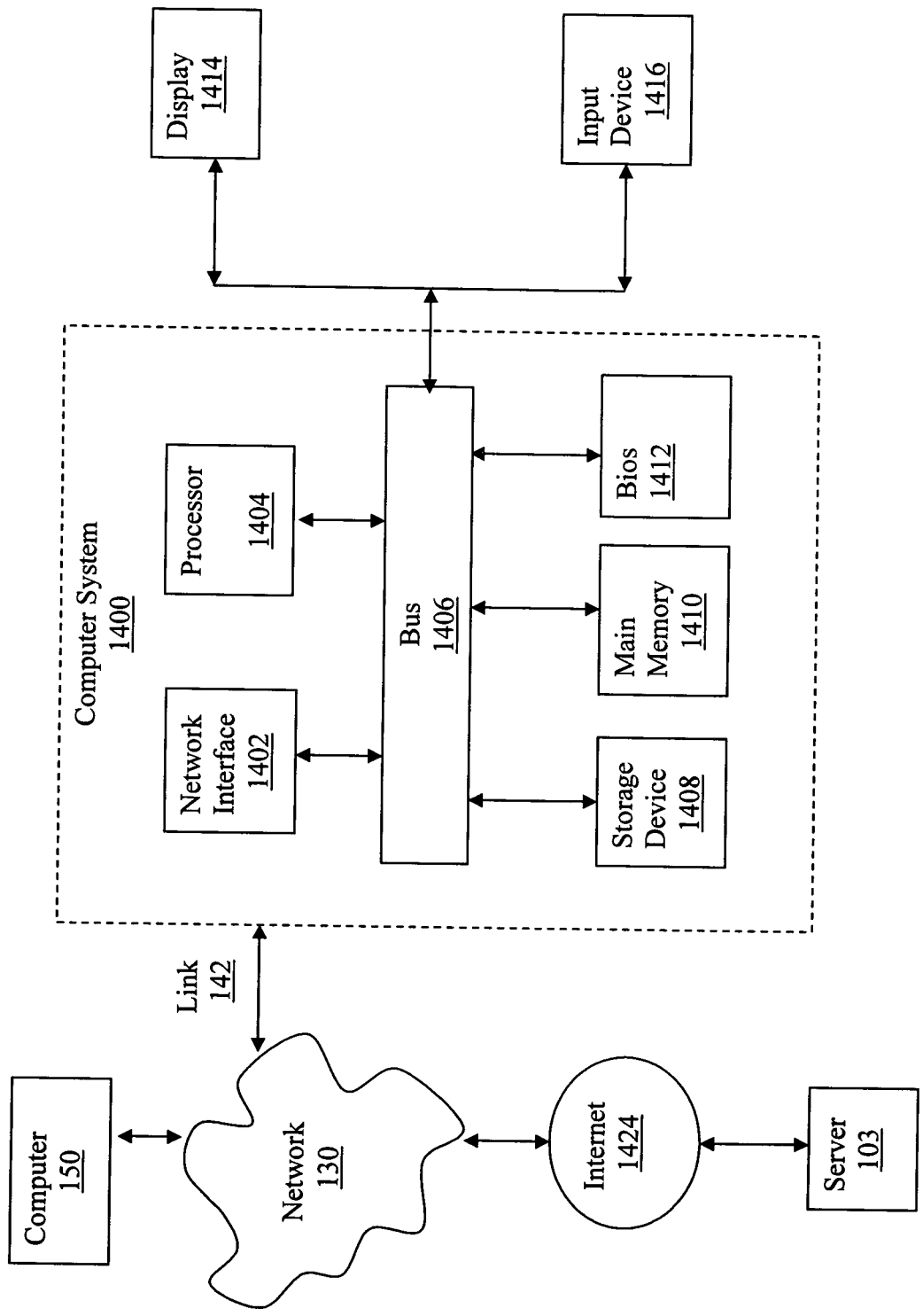
FIG. 20 is a block diagram that illustrates a typical computer system, representing a Web service provider server on which embodiments of the present invention can be implemented.

FIG. 20 is a block diagram that illustrates a typical computer system 1400, well known to those skilled in the art, representing a Web service provider server 100 on which embodiments of the present invention can be implemented. This computer system 1400 comprises a network interface 1402 that provides two-way communications through a wired or wireless link 142 to a wired or wireless communications network 130 that uses any applicable communications technology. For example, the network 130 can comprise a public telephone network, a wireless network, a local area network (LAN), and any known or not-yet-know applicable communications technologies, using correspondingly applicable links. The network 130 in turn provides communications with one or more host computers 150 and, through the Internet 1424, with one or more servers 103.

The network interface 1402 is attached to a bus 1406 or other means of communicating information. Also attached to the bus 1406 are the following:

- a processor 1404 for processing information;
- a storage device 1408, such as an optical disc, a magneto-optical disc, or a magnet disc, for storing information and instructions;
- main memory 1410, which is a dynamic storage device such as a random access memory (RAM) that stores information and instructions to be carried out by processor 1404;
- a bios 1412 or another form of static memory such as read only memory (ROM), for storing static information and instructions to be carried out by processor 1404;
- a display 1414, such as a liquid crystal display (LDC) or cathode ray tube (CRT) for displaying information to user of the computer system 1400; and
- an input device 1416, with numeric and alphanumeric keys for communicating information and commands to processor 1404. In another embodiment a mouse or other input devices can also be used.

The computer system 1400 is used to implement the methods of the present invention in one embodiment. However, embodiments of the present invention are not limited to specific software and hardware configurations. Computer system 1400 can receive data comprising client application messages from computer 150 and server 103 used by client business, through a network 130 such as the Internet, an appropriate links 142, such as wired or wireless ones, and its network interface 1402. It can of course transmit data back to client business application over the same routes.

Computer system 1400 carries out the methods of the present invention when its processor 1404 processes instructions contained in its main memory 1410. Another computer-readable medium, such as its storage device 1408, may read these instructions into main memory 1410 and may do so after receiving these instructions through network interface 1402. Processor 1404 further processes data according to instructions contained in its storage device 1408. Data is relayed to appropriate elements in computer system 1400 through its bus 1406. Instructions for computer system 1400 can also be given through its input device 1416 and display 1414.

"Computer-readable medium" refers to any medium that provides instructions to processor 1404, comprising volatile, non-volatile, and transmission media. Volatile media comprise dynamic memory, such as main memory 1410. Non-volatile media comprise magnetic, magneto-optical, and optical discs, such as storage device 1408. Typical examples of widely used computer-readable media are floppy discs, hard discs, magnetic tape, CD-ROMs, punch cards, RAM, EPROMs, FLASH-EPROMS, memory cards, chips, and cartridges. Multiple computer-readable mediums may be used. Moreover, in different embodiments of the present invention, computer readable mediums may comprise known and not yet known technologies, which can be used, individually and in various combinations.

Alternate Embodiments

Figure 21:
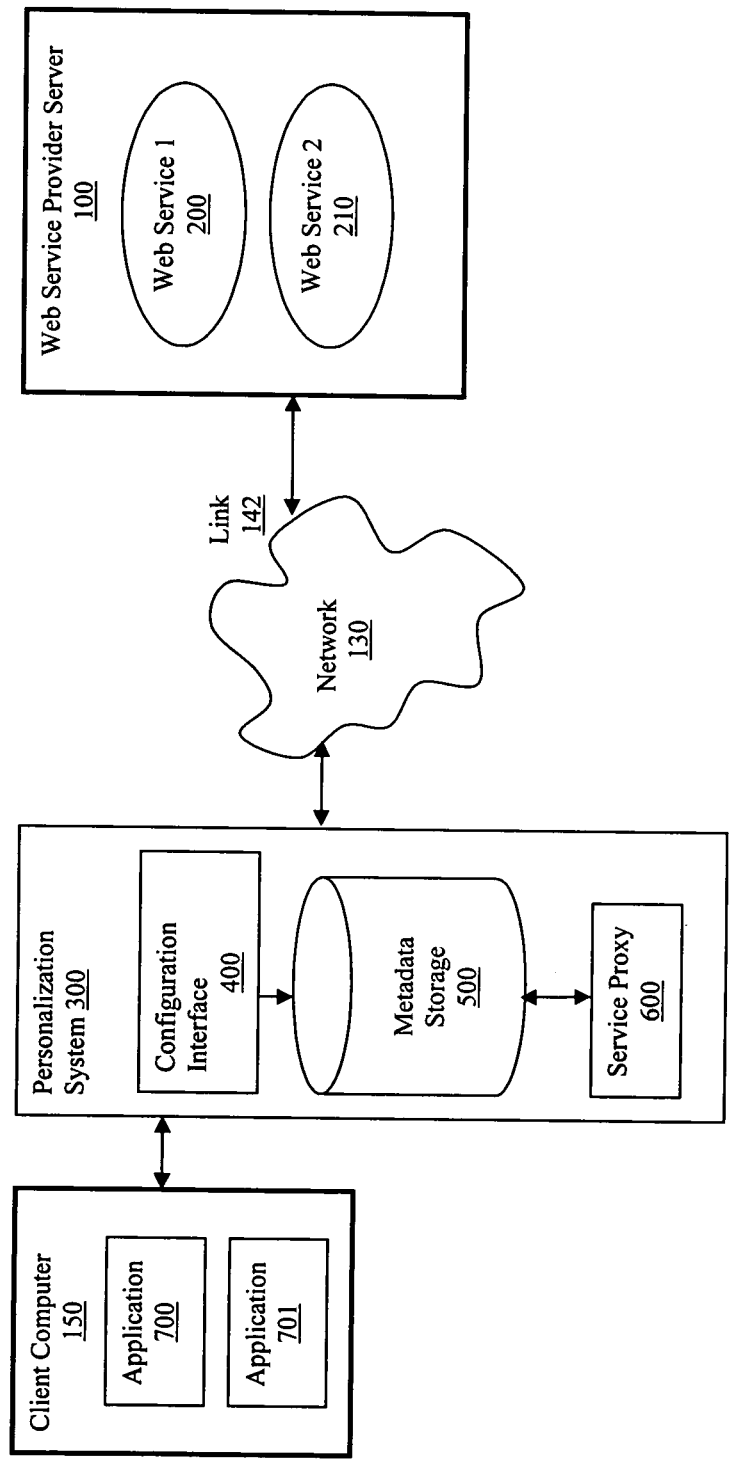
FIG. 21 is a block diagram showing an alternate operating environment in which embodiments of the present invention may be employed, using a personalization system connected to a client computer.

The previous extended description has explained some of the alternate embodiments of the present invention. It will be apparent to those skilled in the art that many other alternate embodiments of the present invention are possible without departing from its broader spirit and scope. For example, FIG. 21 is a block diagram showing an alternate operating environment in which embodiments of the present invention may be employed. In this alternate operating environment, the personalization system 300 can be attached to the client computer 150, as an internal element or a plug-in module, instead of to a Web service provider server 100 as shown in FIG. 1.

Figure 22:
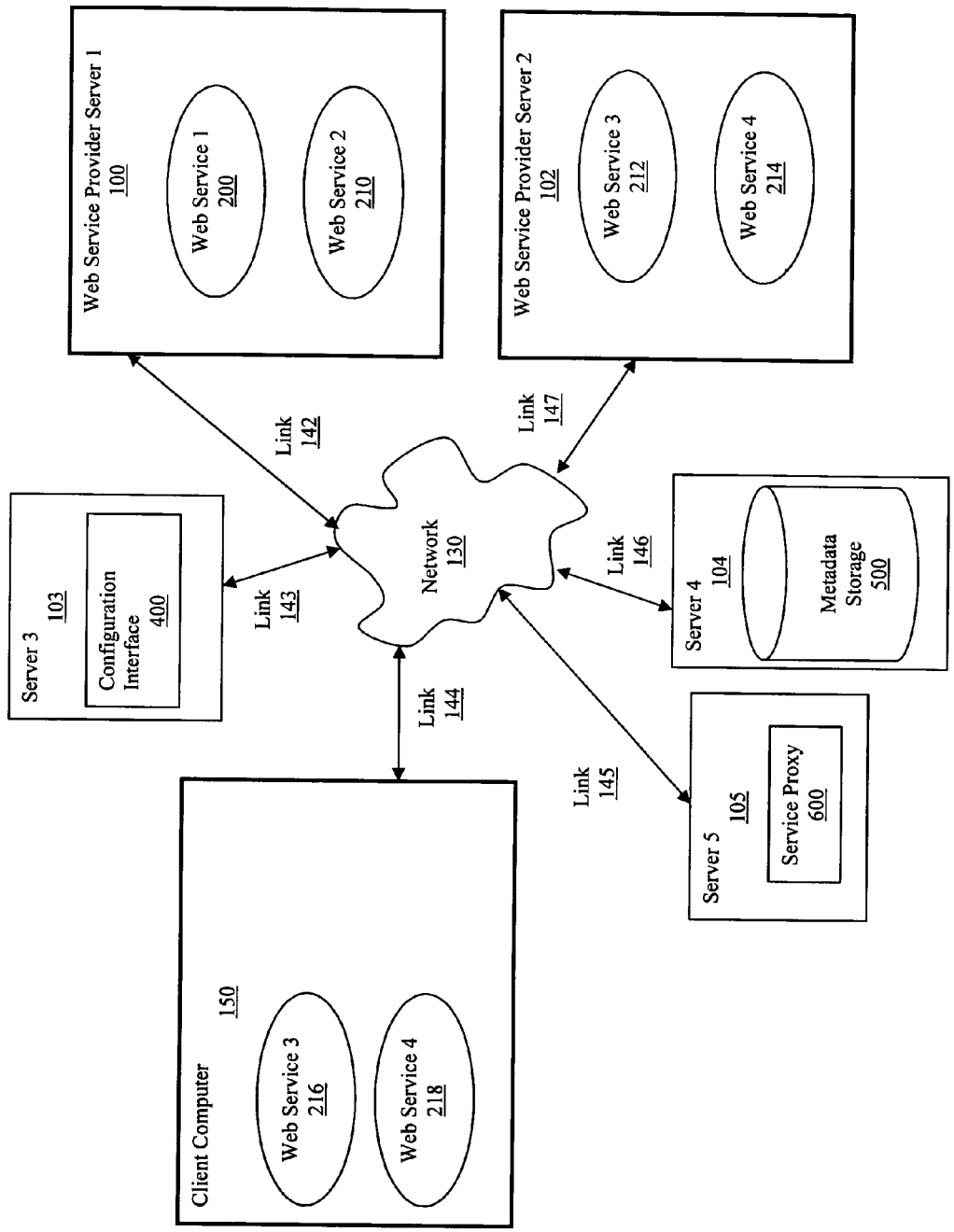
FIG. 22 is a block diagram showing a second alternate operating environment in which embodiments of the present invention may be employed, using a widely dispersed system.

Other embodiments of the present invention are possible where the personalization elements are widely and diversely dispersed among systems. For example, FIG. 22 is a block diagram showing a second alternate operating environment in which embodiments of the present invention may be employed. In this example, the configuration interface 400 can be located on an independent server 103, the service proxy 600 on another server 105, and the metadata storage 500 on yet another server 104. Web services 200 and 210 can be on another server 100, more Web services 212 and 214 on another server 102, and additional Web services 216 and 218 on a client computer 150 can all be interrelated through such a loose system. Communications among these separated elements take place through a network 130 and multiple links: 142, 143, 144, 145, 146, and 147.

In addition, other embodiments are possible that would allow communications over multiple transmission channels to be handled by a personalization system 300. For example, FIG. 23 illustrates an embodiment that uses a channel proxy server 170 that comprises multiple other servers, for example
   an FTP server 171;
   an email server 172; and
   a portal server 173.

In this embodiment, channel proxy server 170 might convert incoming transmissions in multiple formats from multiple computers 150, 160, and 180 into Web service transmissions with SOAP information that service proxy 600 and Web service 200 could use. For outgoing messages, channel proxy server 170 might convert Web service transmissions from Web service 200 into multiple transmission formats useful to multiple computers 150, 160, and 180.

For example, client computer 1 150 might send a message to the FTP server 171 over an FTP channel 174. Channel proxy server 170 would then convert the transmission into Web service channel format so that the transmission could be sent over a Web service channel 176 to service proxy 600 and on to a Web service 200. For outgoing messages, channel proxy server 170 might convert messages from Web service 200 into FTP format for transmission over an FTP channel 174 to client computer 1 150.

One use of this embodiment might be to allow a Web service provider to adjust the priority of Web service responses according to the transmission channel used. For example, transmissions over an FTP channel 174 might require a faster response than messages over an email channel 175.

It will also be apparent to those skilled in the art that different embodiments of the present invention may employ a wide range of possible hardware and of software techniques. For example the communication between a Web service provider and client business computers could take place through any number of links, including wired, wireless, infrared, or radio ones, and through other communication networks beside those cited, including any not yet in existence.

Also, the term computer is used here in its broadest sense to include personal computers, laptops, telephones with computer capabilities, personal data assistants (PDAs) and servers, and it should be recognized that it could include multiple servers, with storage and software functions divided among the servers. A wide array of operating systems, compatible e-mail services, Web browsers and other communications systems can be used to transmit messages among client applications and Web services.

Furthermore, in the previous description the order of processes, their numbered sequences, and their labels are presented for clarity of illustration and not as limitations on the present invention.

What is claimed is:

1. A method of automatically and dynamically supplying personalized communications parameters used for communications between a Web service and a source comprising:
   executing a service proxy on a server computer, wherein the service proxy manages applying communications parameters to messages communicated across a computer network between one or more client applications and one or more Web services;
   storing client communications parameters in a computer readable storage accessible to the service proxy by:
      receiving at least one configuration of client-specified communications parameters wherein each configuration includes at least one interface variable and at least one context variable;
      storing each configuration of client-specified communications parameters as an associated subscriber profile in the computer readable storage;
   storing Web service provider configured information as at least one service profile in the computer readable storage accessible to the service proxy;
   utilizing the service proxy to apply particular communications parameters to client application messages by:
      receiving a client application incoming message, wherein the client application incoming message comprises a header having context information, and a body having a corresponding Web service request;
      reading the context information from the client application incoming message;
      utilizing the context information read from the client application incoming message to retrieve a selected subscriber profile from the computer readable storage;
      utilizing the context information read from the client application incoming message to retrieve a selected service profile from the computer readable storage;
      applying the particular communications parameters determined from the retrieved subscriber profile and from the retrieved service profile to transform the incoming message to personalize the client's web service request, and
      forwarding the client's personalized web service request to the web service end point of the associated Web service by invoking the Web service to execute the request contained in that personalized client application message.

2. The method of claim 1 further comprising allowing the source to set up the context variables as at least one of:
   web service variables;
   user variables; and
   channel variables.

3. The method of claim 2 wherein setting up the context variables as channel variables further comprises setting up the channel variables as at least one of:
- faced variables for messages sent on behalf of a human operator; and
- faceless variables for messages sent by machine-to-machine.

4. The method of claim 1 further comprising storing hierarchies as at least one of:
- at least one web service hierarchy; and
- at least one user hierarchy, such that the hierarchies permit inheritance of the communications parameters.

5. The method of claim 1 further comprising storing the subscriber profiles in the computer readable storage as at least one of:
- interface parameters; and
- context parameters.

6. The method of claim 1 further comprising predefining client application messages as:
- a SOAP envelope comprising
- a plurality of context headers, and
- a message body.

7. The method of claim 1 further comprising storing hierarchies in the computer readable storage as at least one of:
- at least one suite of applications;
- at least one application within the suite of applications;
- at least one business service related to the application; and
- at least one web service related to the business service.

8. The method of claim 1 further comprising storing at least one hierarchy as a user hierarchy in the computer readable storage including at least one of:
- an organization;
- at least one group within the organization; and
- at least one individual within the group.

9. The method of claim 1 further comprising executing a configuration interface that allows the source to set up communications parameters including at least one context variable as a user variable including at least one of:
- an organization identifier;
- a group identifier; and
- an individual identifier.

10. The method of claim 3 wherein setting up the channel variables further comprises setting up the faced variables as a channel identification selected from the group consisting of a web browser; and a handheld device.

11. The method of claim 3 wherein setting up the channel variables further comprises setting up the faceless variables as a channel identification selected from the group consisting of HTTP; FTP; a web service; and EDI.

12. The method of claim 1 wherein further comprising predefining the formats of a plurality of client application messages by predefining the context headers of the client application messages as at least one of:
- a web service header indicating the web service;
- a user header indicating the user invoking the web service;
- a timestamp header indicating the time the message was sent; and
- a channel header indicating the transmission channel of the application message.

13. The method of claim 1 further comprising executing a configuration interface used by sources to set up the context variables as a timeframe.

14. The method of claim 1 further comprising executing a configuration interface used by sources to set up the interface variables that define as at least one of:
- encryption level;
- timeout; and
- number of retries.

15. The method of claim 1 wherein applying the correct communications parameters determined from the retrieved subscriber profile and from the retrieved service profile to transform the incoming message to personalize the client's web service request further comprises:
- determining the context parameters of the incoming message;
- retrieving the service profile for the web service to be invoked; and
- applying specified interface parameters to the client application incoming message to personalize the client's web service request.

16. The method according to claim 1 further comprising:
- setting up WSDL documents for communicating context information to the personalization system.

17. A system to automatically and dynamically supply personalized communications parameters used for communications between a web service and a source comprising:
- a server computer connected to a computer network;
- a computer readable metadata storage, wherein the server computer is configured for communication with the computer readable metadata storage;
- a configuration interface executed on the server computer, which is used by sources to set up communications parameters to be applied automatically to messages between client applications and associated Web services;
- a service proxy executed on the server computer, wherein the service proxy manages applying communications parameters to messages communicated across the computer network between one or more client applications and one or more Web services;
- wherein client communications parameters are stored by:
  - receiving a client-specified communications parameters configuration through the configuration interface,
  - storing each configuration of client-specified communications parameters as an associated subscriber profile in the computer readable metadata storage;
  - storing Web service provider configured information as at least one service profile in the computer readable metadata storage accessible to the service proxy; utilizing the service proxy to apply particular communications parameters to client application messages using the service proxy by:
    - receiving a client application incoming message, wherein the client application incoming message comprises a header having context information, and a body having a corresponding Web service request;
    - reading the context information from the client application incoming message;
    - utilizing the context information read from the client application incoming message to retrieve a selected subscriber profile from the computer readable metadata storage;
    - utilizing the context information read from the client application incoming message to retrieve a selected service profile from the computer readable metadata storage;
    - applying the particular communications parameters determined from the retrieved subscriber profile and from the retrieved service profile to transform the incoming message to personalize the client's web service request, and
    - forwarding the client's personalized web service request to the web service end point of the associated Web service by invoking the Web service to execute the request contained in that personalized client application message.

* * * * *